US006817294B2

(12) United States Patent
Zahavi

(10) Patent No.: US 6,817,294 B2

(45) Date of Patent: Nov. 16, 2004

(54) PLATE STORAGE AND LOADING

(75) Inventor: Avi Zahavi, Hod Hasharon (IL)

(73) Assignee: Creo Il. Ltd., Herzlia (IL)

( * ) Notice: Subject to any disclaimer, the term of this patent is extended or adjusted under 35 U.S.C. 154(b) by 64 days.

(21) Appl. No.: 10/292,054

(22) Filed: Nov. 12, 2002

(65) Prior Publication Data

US 2003/0140807 A1 Jul. 31, 2003

Related U.S. Application Data

(60) Provisional application No. 60/351,364, filed on Jan. 28, 2002.

(51) Int. Cl.[7] .......................... B41L 47/14; B65G 1/133

(52) U.S. Cl. .............. 101/477; 414/331.05; 414/331.02

(58) Field of Search ....................... 414/331.02, 331.03, 414/331.05; 211/50, 53, 56, 1.52, 1.55, 163, 165, 168; 101/477, 463.1, 467, 471, 480, 401.1; 273/149 R, 149 P; 221/119, 120

(56) References Cited

U.S. PATENT DOCUMENTS

| | | | | | |
|---|---|---|---|---|---|
| 4,273,427 | A | * | 6/1981 | Bailey | 353/27 A |
| 4,361,858 | A | * | 11/1982 | Chambers | 360/92 |
| 4,472,898 | A | * | 9/1984 | Tanaka | 40/378 |
| 5,062,763 | A | * | 11/1991 | Maier | 414/787 |
| 5,992,324 | A | | 11/1999 | Rombult et al. | 101/477 |

FOREIGN PATENT DOCUMENTS

| | | | | |
|---|---|---|---|---|
| GB | 2025322 A | * | 1/1980 | B41L/47/14 |

* cited by examiner

*Primary Examiner*—Daniel J. Colilla

(74) *Attorney, Agent, or Firm*—Wilmer Cutler Pickering Hale and Dorr LLP

(57) ABSTRACT

A storage and loading device for sheet articles, wherein the articles are stored vertically in a rotating carousel. A picking mechanism picks a foremost article and delivers it to a depositing location. A slip-sheet removal mechanism removes protective slip sheets located between the sheet articles. The device may be used in conjunction with a CTP system.

26 Claims, 4 Drawing Sheets

PLATE STORAGE AND LOADING

Priority is herewith claimed under 35 U.S.C. § 119(e) from Provisional Patent Application 60/351,364 filed Jan. 28, 2002, which is incorporated by reference in its entirety.

FIELD OF THE INVENTION

The present invention relates to the exposure of offset printing plates and more specifically to a storage device for storing unexposed plates and automatically loading them onto an exposure unit and for removing and discarding interleaf paper-sheets located between the unexposed plates.

BACKGROUND OF THE INVENTION

A CTP system accepts input jobs/pages written in a page description language, for example, Postscript. The jobs are sent through a raster image processor to a platemaker for exposure. The platemaker engine images the raster data on a plate, which is later mounted on the press, inked and made ready for printing.

The inclusion of a CTP system into a printing operation suggests a greater extent of automation that can be achieved. A full CTP process can automate, through the use of computers and special equipment, the transfer of information from the original layout to the press plate.

Also included in the automation of a CTP system is the media handling. It is necessary to supply plates individually from a plate supply area to the platemaker engine and it is desirable to reduce the amount of operator handling involved. Unexposed plates are normally supplied in packages of 25 to 100 plates, with interleaf paper-sheets between the plates for protecting the emulsion side of the plates, which is extremely sensitive to scratches. The stack of plates needs to be loaded into a supply area of a platemaker in a manner that will keep the stack of plates aligned with automation mechanisms for removing a plate from the stack, and for discarding the interleaf sheets from the stack.

An existing CTP system, which is marketed under the LithoSetter mark by Barco Graphics, Belgium, contains a slip-sheet removal mechanism that utilizes suction cups on a picking bar to lift the leading edge of the slip-sheet so that a vacuum table may be moved underneath the slip-sheet. Once the slip-sheet is resting entirely on the vacuum table, suction is applied to adhere the slip-sheet to the vacuum table and the table then carries the slip-sheet to a discard area.

Another slip-sheet removal mechanism, implemented in the Trendsetter VLF CTP machine produced and sold by Creo Inc., Canada, utilizes suction applied through holes in two concentric cylinders, which are attached to a picking arm, in order to grasp the slip-sheet and carry it to two pinch-rollers that guide it into a discard bin.

U.S. Pat. No. 5,992,324 to Rombult et at describes an automatic plate loading system, including a plate handler in which plates are stored horizontally in equal-sized stacks and a slip-sheet removal mechanism. When the stack containing plates of the required size has been positioned in an access position inside the plate handler, a picking mechanism picks the topmost plate and transports it to the imaging area. Air flow is then activated to peel off an edge of the slip-sheet, followed by gripping the peeled-off edge by mechanical "fingers" and lowering the cassette to further separate the slip-sheet from the plate above. The slip-sheet is then sucked by suction-cups, to separate it from the plate underneath and is rotatably driven out of the cassette and released.

The Lotem CTP machine, produced and sold by Creo Inc., Canada, also includes a horizontal plate-storage in cassettes, wherein the cassettes move vertically and the active cassette slides out of the storage area and into the imaging area where a picker picks the topmost plate and subsequently the slip-sheet lying underneath the picked plate is removed.

The systems mentioned above use horizontal storage of the plates. There are some advantages to vertical storage, such as:

- Transporting plates in a vertical position is more efficient, since the travel distance is shorter
- Vertical handling of plates reduces the probability of one plate slipping against another and scratching it
- Floor space may be more efficiently used, especially when very large plates are being used.

With imaging processes getting faster, due to technological improvements such as multi-beam imaging, it is foreseen that the process of plate loading will become a bottle-neck, unless made more efficient, for example by performing the plate picking and the slip-sheet removal in parallel.

An additional effect of the faster imaging will be a greater amount of discarded paper accumulating per unit of time.

There is thus a need for a fast and reliable process of plate loading and slip-sheet removal, in which the discarded paper occupies minimal volume.

SUMMARY OF THE INVENTION

It is an object of the present invention to supply two mechanisms for simultaneously removing a plate and an inter-plate paper sheet, so as to speed-up the plate loading process.

It is another object of the present invention to provide a new method and apparatus for storing unexposed plates in a plate supply area.

There is thus provided, according to one aspect of the present invention, a vertical storage and loading apparatus for sheet articles, comprising:

- a storage carousel;
- a picking mechanism for picking one of said sheet articles stored in said carousel,
- wherein a plurality of said sheet articles are stored vertically in said carousel.

According to one embodiment of this aspect, the storage carousel comprises:

- a base;
- a rotating body; and
- a plurality of sheet holder pairs, slidingly movable along at least one track, said at least one track on the upper surface of said base.

Accoding to another embodiment of this aspect, the carousel is round.

Accoding to another embodiment of this aspect, the picking mechanism is transportable between a picking position, for picking a sheet article from said carousel and a delivering position.

Accoding to another embodiment of this aspect, the picking mechanism comprises vacuum.

Accoding to another embodiment of this aspect, the apparatus additionally comprises loading means for loading said sheet articles onto said carousel.

Accoding to another embodiment of this aspect, the apparatus additionally comprises slip-sheet removal mechanism for removing protective slip-sheets positioned between said stored sheet articles.

The slip-sheet removal mechanism may comprise a friction wheel and may deposit the removed slip-sheets horizontaaly, preferrably within the base of the carousel.

Accoding to another embodiment of this aspect, the picking mechanism is transportable between a picking position, for picking a sheet article from said carousel and a delivering position.

Accoding to another embodiment of this aspect, the picking mechanism comprises vacuum.

Accoding to another embodiment of this aspect, the apparatus additionally comprises loading means for loading said sheet articles onto said carousel.

Accoding to another embodiment of this aspect, the apparatus additionally comprises slip-sheet removal mechanism for removing protective slip-sheets positioned between said stored sheet articles.

The slip-sheet removal mechanism may comprise a friction wheel and may deposit the slip-sheets horizontally, preferrably within said carousel base.

According to another aspect of the present invention, there is provided a vertical storage and loading apparatus for printing plates, In a Computer To Plate (CTP) system, comprising:

a storage carousel; and a picking mechanism for picking one of said printing plates stored in said carousel, wherein a plurality of said printing plates are stored vertically in said carousel.

According to another aspect of the present invention, there is provided a CTP system comprising:

an imaging device for imaging printing plates;

an imaging surface for holding said printing plates during said imaging; and a vertical storage and loading apparatus comprising:

a storage carousel; and a picking mechanism for picking one of said printing plates stored in said carousel, wherein a plurality of said printing plates are stored vertically in said carousel.

The imaging surface may be an external drum, an internal drum or a flatbed. According to another aspect of the present invention, there is provided a method of storing and loading sheet articles, comprising the steps of:

providing a storage carousel for storing a plurality of said sheet articles;

providing a picking mechanism;

storing said sheet articles in said carousel in a vertical position; and using said picking mechanism for picking one of said sheet articles and delivering said picked sheet article to a depositing location.

According to one embodiment of this aspect, the storage carousel comprises:

a base;

a rotating body; and a plurality of sheet holder pairs, slidingly movable along at least one track, said at least one track on the upper surface of said base.

According to another embodiment of this aspect, the carousel is round.

According to another embodiment of this aspect, the picking mechanism comprises vacuum.

According to another embodiment of this aspect, the method additionally comprising the step of removing protective slip-sheets positioned between said stored sheet articles.

The step of removing said protective slip-sheets may comprise using a friction wheel.

The slip-sheets may be deposited horizontally, preferrably within said carousel base.

In another aspect of the present invention there is a method of storing and loading printing plates provided in a Computer To Plate (CTP) system, comprising the steps of:

providing a storage carousel for storing a plurality of said printing plates;

providing a picking mechanism;

storing said printing plates in said carousel in a vertical position; and using said picking mechanism for picking one of said stored plates and delivering said picked plate to an imaging surface.

The imaging surface may be an external drum, an internal drum, or a flatbed.

DETAILED DESCRIPTION OF A PREFERRED EMBODIMENT

The detailed description hereinbelow refers to printing plates in a CTP machine. It is, however, possible to use the apparatus and method of the present invention for any other application requiring storage and automatic pickup of flexible plate-like material, such as sheet metal, possibly but not necessarily separated by protective sheets.

Figure 1A:
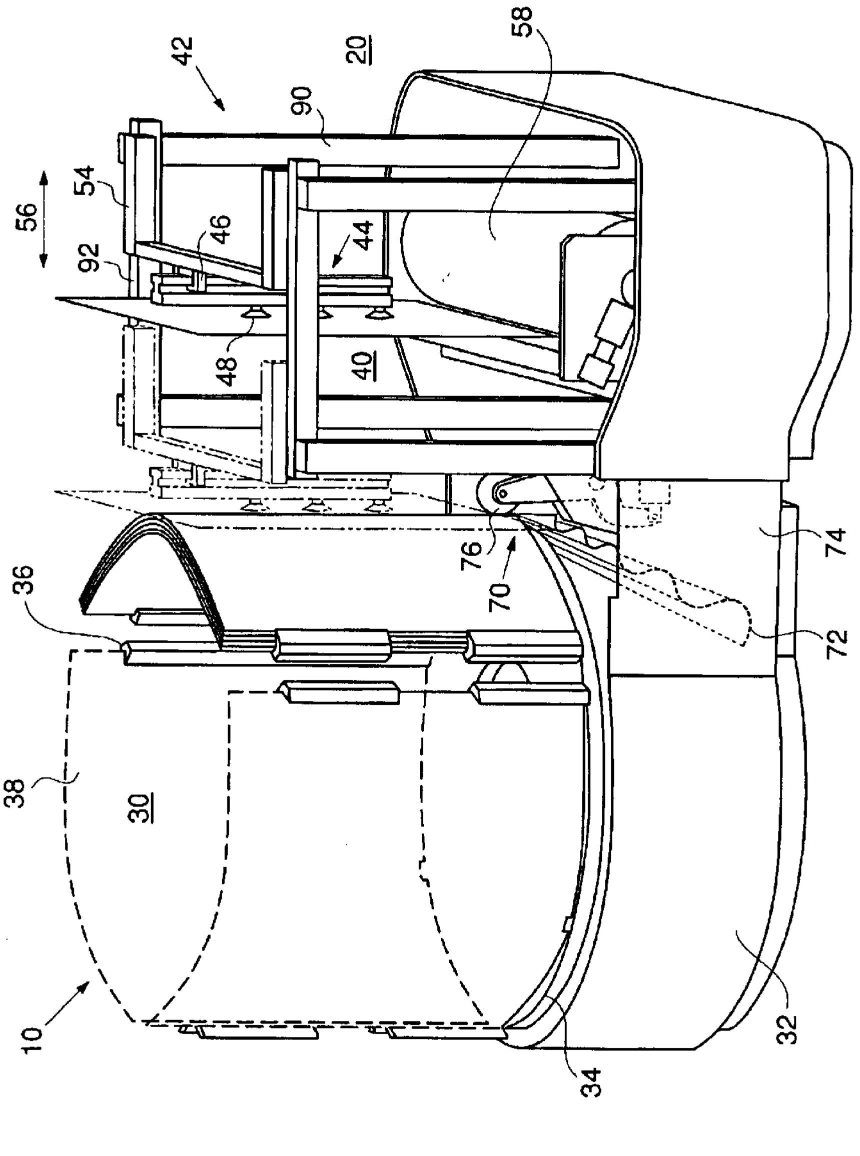
FIG. 1A is a schematic drawing of a CTP system according to one embodiment present invention.

FIG. 1A is a schematic drawing of a CTP system according to the present invention. The system comprises a plate storage and supply area, generally denoted 10 and an imaging area, generally denoted 20. The plate storage and supply area 10 comprises a carousel, generally denoted 30 and a plate picking and slip-sheet removal mechanism, generally denoted 40.

Carousel 30 is the plate storage area. It comprises a rounded base 32, a track 34 on the upper surface of base 32 and one or more pairs of vertical holders 36, mounted on track 34. The plates 38 are inserted into the carousel 30 in an upright position and each plate 38 is held between two holders 36.

Figure 1B:
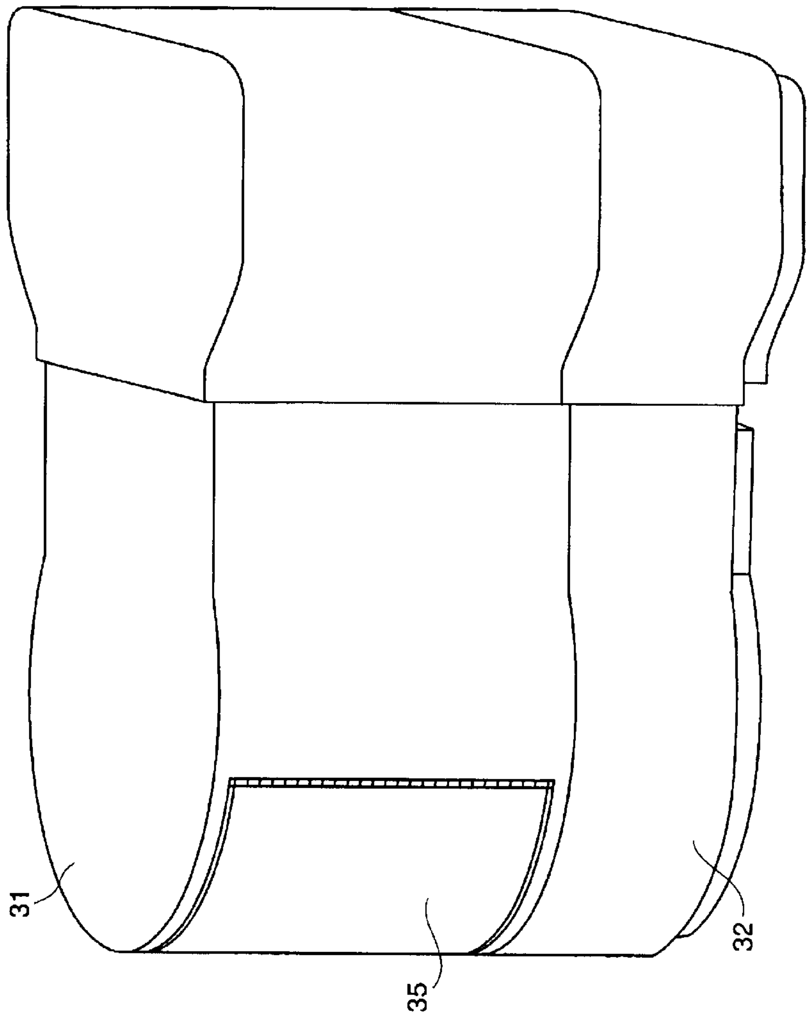
FIG. 1B is a schematic drawing of the CTP machine of FIG. 1A in an operational configuration.

FIG. 1B is a schematic drawing of the CTP machine of FIG. 1A in an operational configuration, with cover 31 placed around carousel 30 for light and dust protection.

Figure 2:
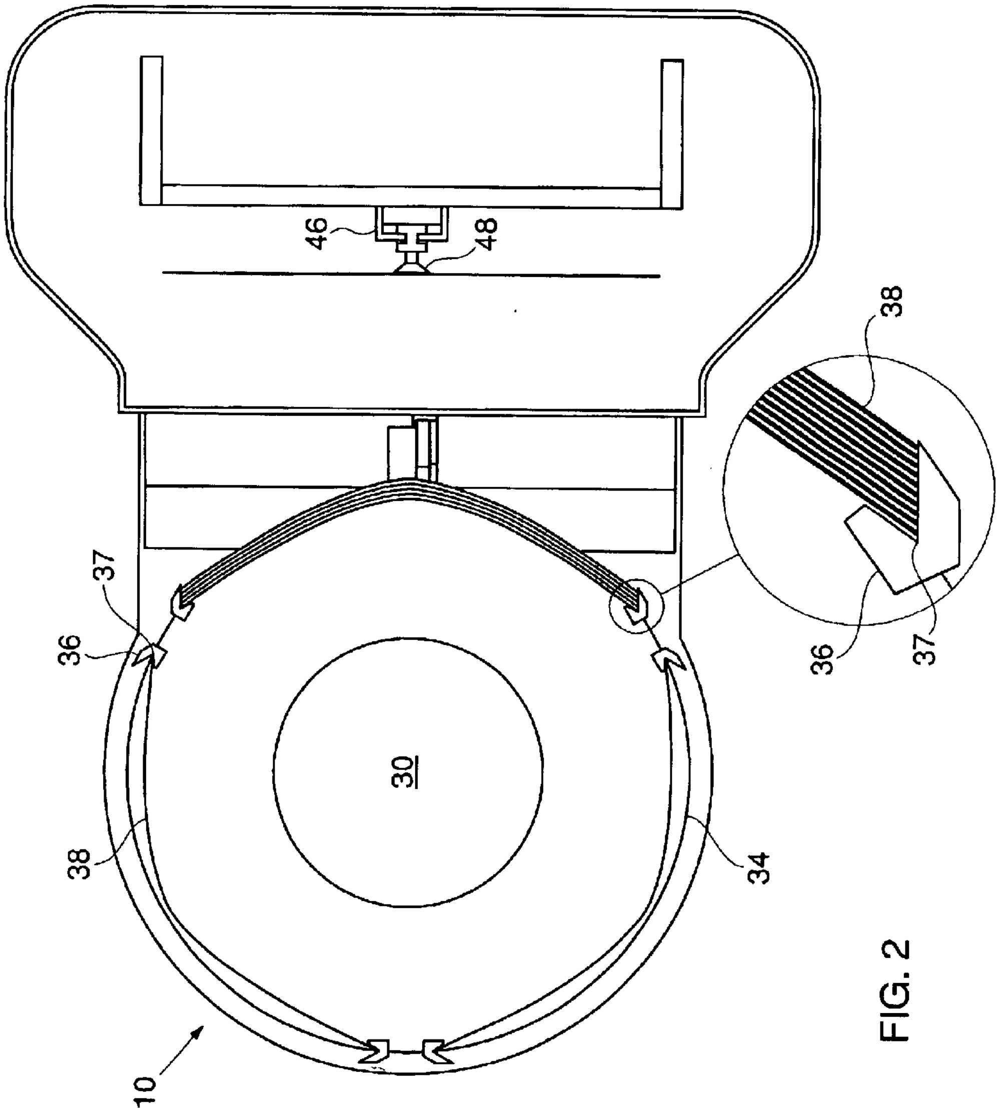
FIG. 2 is a schematic top-view of the system of the present invention.

Attention is also drawn now to FIG. 2, presenting a schematic top-view of the system of the present invention. In the embodiment of FIG. 2 the vertical holders 36 are shaped so as to create an inner angle 37, against which the plate 38 rests. It will be appreciated that other mechanisms for holding the plate 38 against the holders 36 are in the scope of the present invention. A plurality of plates 38 may be held between each pair of holders 36. Vertical holders 36 are horizontally slideable along track 34, so that the distance between each pair of holders may be changed to enable accomodation of different plate sizes. Carousel 30 is rotatbly mounted on base 32.

Carousel 30 need not necessarily be round. Rather, it may assume any polygonal shape. In this case, the plates 38 will be mounted on the edges of the polygon, with holders 36 movable within the boundaries of the edge.

Plate picking and slip-sheet removal mechanism 40 comprises a frame 42, having four vertical beams 90 holding two side rails 92 and an upper frame 54 slidable along rails 92, a vacuum subsystem 44 and a slip-sheet removal mechanism 70. Vacuum subsystem 44 comprises a robotic arm 46, extending from the upper beam of frame 54. Vacuum cups 48 are vertically slidable along robotic arm 46.

Imaging area 20 comprises an imaging drum 58 and an imaging head (not shown). Imaging area 20 does not comprise part of the claimed invention and may be any plate imaging system, be it external drum, internal drum or flat-bed.

The plate storage and supply area and the loading process are controlled by a controller (not shown), which may reside within the imaging area 20, within the plate storage and supply area 10, or external to both.

When new plates are to be loaded into the carousel 30, the carousel is rotated by a servo electric motor until the slot to be filled faces a service door 35 (FIG. 1B), which may be located at the end of the carousel opposite to the imaging drum, or at any other suitable location. It will be appreciated that loading new plates into the carousel may be performed concurrently with an imaging operation of the imaging unit.

When a new plate is to be loaded for imaging onto the imaging drum, the following sequence of operations takes place:

First, the controller checks if a plate of the required size is currently at the access position, namely, facing the robotic arm 46. If not, the controller instructs the carousel to revolve until such condition is fulfilled.

Next the controller instructs the frame 54 to slide along rails 92 in the direction of the carousel, until contact is established between the suction cups 48 and the plate to be loaded. Vacuum is now turned on and the foremost plate is held by the vacuum cups. Next, the vacuum cups slide upwards along robotic arm 46, to lift the plate to a predefined height, thus revealing a bottom edge of the slip-sheet 72 situated between the lifted plate and the plate behind it. The height to which the plate is lifted is preferrably determined so that the slip-sheet does not slide downwards.

Figure 3:
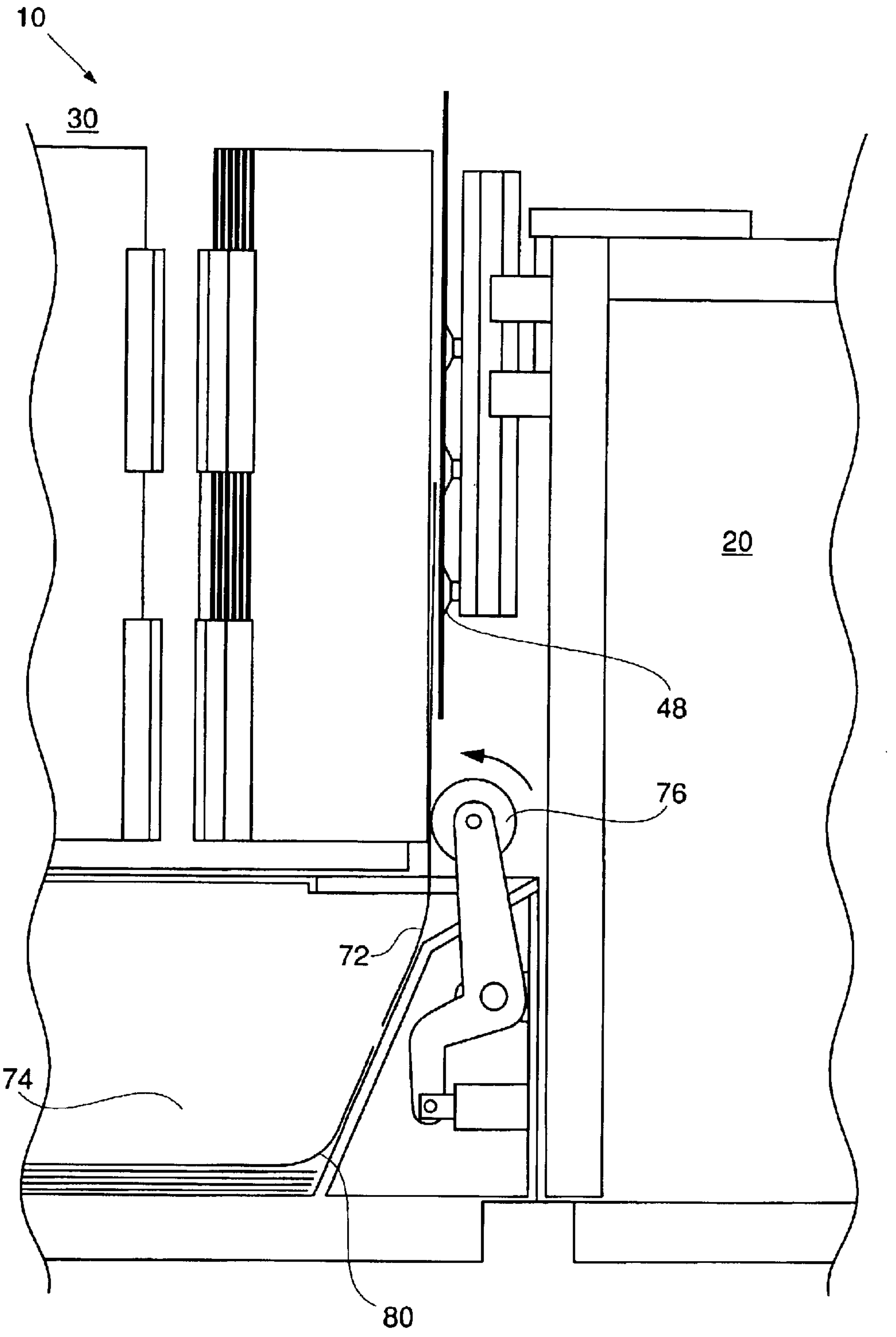
FIG. 3 is a detailed schematic view of the slip-sheet removal mechanism accoeding to one embodiment of the present invention.

Attention is drawn now to FIG. 3, which is a detailed schematic view of the slip-sheet removal mechanism. After the plate has been lifted, the slip-sheet removal mechanism 70 grabs the bottom part of the slip-sheet 72, which has been revealed, and pulls it downwards towards a slip-sheet collecting bin 74, which may be situated under the carousel. The discarded slip-sheets may be dropped into the collecting bin 74 horizontally, one on top of the other, for optimal space usage. The slip sheet removal mechanism preferrably comprises a roller 76 that pulls the paper downwards by friction. Alternatively, the slip sheet removal mechanism 70 may comprise an additional set of vacuum cups. If a vacuum system is used, a blade preferrably holds the other side of the slip-sheet, to help avoid sliding.

As soon as the slip-sheet has been grabbed, the frame 54, with the plate hanging from it by vacuum, is moved back in the direction of imaging drum 58. When reaching a predefined distance from the carousel, the plate is lowered by sliding the suction cups 48 in a downward direction towards a punch unit (not shown) located between carousel 30 and imaging area 20.

After the plate has been punched, the frame is moved further in the direction of the imaging area 20, until the plate hangs vertically above the near end of the imaging drum 58. The plate is then lowered into contact with the imaging drum 58 and is loaded onto it using methods known in the art.

What is claimed is:

1. Vertical storage and loading apparatus for sheet articles, comprising:

a storage carousel for vertically storing a plurality of sheet articles, said sheet articles wrapped around the circumference of said carousel; and a picking mechanism for picking one of said sheet articles stored in said carousel.

2. The apparatus of claim 1, wherein said storage carousel comprises:

a base;

a rotating body; and a plurality of sheet holder pairs, slidingly movable along at least one track, said at least one track on the upper surface of said base.

3. The apparatus of claim 1, wherein said carousel is round.

4. The apparatus of claim 1, wherein said picking mechanism is transportable between a picking position, for picking a sheet article from said carousel and a delivering position.

5. The apparatus of claim 1, wherein said picking mechanism comprises vacuum.

6. The apparatus of claim 1, additionally comprising slip-sheet removal mechanism for removing protective slip-sheets positioned between said stored sheet articles.

7. The apparatus of claim 6, wherein said slip-sheet removal mechanism comprises a friction wheel.

8. The apparatus of claim 6 wherein said removed slip-sheets are deposited horizontally.

9. The apparatus of claim 6 wherein said removed slip-sheets are deposited within said carousel base.

10. In a Computer To Plate (CTP) system comprising an imaging device for imaging printing plates; an imaging surface for holding said printing plates during said imaging; and a vertical storage and loading apparatus for printing plates, comprising:

a storage carousel for vertically storing a plurality of printing plates, said plates wrapped around the circumference of said carousel; and a picking mechanism for picking one of said printing plates stored in said carousel.

11. A CTP system comprising;

an imaging device for imaging printing plates;

an imaging surface for holding said printing plates during said imaging; and a vertical storage and loading apparatus comprising:

a storage carousel; and a picking mechanism for picking one of said printing plates stored in said carousel.

12. The system of claim 11 wherein said imaging surface is an external drum.

13. The system of claim 11 wherein said imaging surface is an internal drum.

14. The system of claim 11 wherein said imaging surface is a flatbed.

15. A method of storing and loading sheet articles, comprising the steps of:

providing a storage carousel for storing a plurality of sheet articles;

providing a picking mechanism;

storing said sheet articles in said carousel in a vertical position, said sheet articles wrapped around the circumference of said carousel; and using said picking mechanism for picking one of said sheet articles and delivering said sheet article to a depositing location.

16. The method of claim 15, wherein said storage carousel comprises:

a base;

a rotating body; and a plurality of sheet holder pairs, slidingly movable along at least one track, said at least one track on the upper surface of said base.

17. The method of claim 15, wherein said carousel is round.

18. The method of claim 15, wherein said picking mechanism comprises vacuum.

19. The method of claim 15, additionally comprising the step of removing protective slip-sheets positioned between said stored sheet articles.

20. The method of claim 19, wherein said step of removing comprises using a friction wheel for removing said protective slip-sheets.

21. The method of claim 19, additionally comprising the step of depositing said removed protective slip-sheets horizontally.

22. The method of claim 19, additionally comprising the step of depositing said removed protective slip-sheets within said carousel base.

23. In a Computer To Plate (CTP) system, a method of storing and loading printing plates, comprising the steps of:

providing a storage carousel for storing a plurality of printing places;

providing a picking mechanism;

storing said printing plates in said carousel in a vertical position; and using said picking mechanism for picking one of said stored plates and delivering said picked plate to an imaging surface.

24. The method of claim 23, wherein said imaging surface is an external drum.

25. The method of claim 23, wherein said imaging surface is an internal drum.

26. The method of claim 23, wherein said imaging surface is a flat bed.

* * * * *

UNITED STATES PATENT AND TRADEMARK OFFICE

CERTIFICATE OF CORRECTION

PATENT NO. : 6,817,294 B2
DATED : November 16, 2004
INVENTOR(S) : Avi Zahavi

It is certified that error appears in the above-identified patent and that said Letters Patent is hereby corrected as shown below:

Column 8,
Line 4, "printing places;" should read -- printing plates; --

Signed and Sealed this

Nineteenth Day of April, 2005

JON W. DUDAS
*Director of the United States Patent and Trademark Office*